US011811724B2

(12) United States Patent
Tung

(10) Patent No.: US 11,811,724 B2
(45) Date of Patent: Nov. 7, 2023

(54) METHOD AND SYSTEM FOR RESOLVING UNI PORT INFORMATION ON AN EXTERNAL SOC/SWITCH BASED ON A MAC-TABLE CACHE

(71) Applicant: OPTICORE TECHNOLOGIES, INC., Irvine, CA (US)

(72) Inventor: Chung-Kai Tung, Taipei (TW)

(73) Assignee: OPTICORE TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 17/349,956

(22) Filed: Jun. 17, 2021

(65) Prior Publication Data

US 2021/0400012 A1 Dec. 23, 2021

Related U.S. Application Data

(60) Provisional application No. 63/041,828, filed on Jun. 20, 2020.

(51) Int. Cl.
*H04L 61/4552* (2022.01)
*H04L 69/22* (2022.01)
*H04L 67/568* (2022.01)
*H04L 101/622* (2022.01)

(52) U.S. Cl.
CPC ........ *H04L 61/4552* (2022.05); *H04L 67/568* (2022.05); *H04L 69/22* (2013.01); *H04L 2101/622* (2022.05)

(58) Field of Classification Search
CPC ............. H04L 61/1552; H04L 61/6022; H04L 67/2842; H04L 69/22
See application file for complete search history.

(56) References Cited

U.S. PATENT DOCUMENTS

| 8,570,856 | B2* | 10/2013 | Southworth | ........ H04L 49/3009 370/217 |
| 10,284,469 | B2* | 5/2019 | Vobbilisetty | .......... H04L 45/745 |
| 11,088,945 | B1* | 8/2021 | Deshpande | ........... H04L 45/745 |
| 2002/0186705 | A1 | 12/2002 | Kadambi et al. | |
| 2005/0141501 | A1 | 6/2005 | Kadambi et al. | |
| 2006/0262791 | A1 | 11/2006 | Kadambi et al. | |
| 2013/0223438 | A1* | 8/2013 | Tripathi | ................. H04L 69/22 370/355 |
| 2020/0153655 | A1 | 5/2020 | Ogawa et al. | |

FOREIGN PATENT DOCUMENTS

TW 201916647 A 4/2019

\* cited by examiner

*Primary Examiner* — Nam T Tran
(74) *Attorney, Agent, or Firm* — The Marbury Law Group/Qualcomm

(57) ABSTRACT

The present invention provides a method of using a mac-table cache to resolve UNI port information on an external system of chip (SOC) is provide. The method comprises, receiving, by a packet processing chip, a packet with a source address (SA); locating, by the packet processing chip, the SA in a mac-table cache implemented on the packet processing chip; and looking up a SOC mac-table implemented on the external SOC if the SA cannot be found in the mac-table cache.

4 Claims, 3 Drawing Sheets

METHOD AND SYSTEM FOR RESOLVING UNI PORT INFORMATION ON AN EXTERNAL SOC/SWITCH BASED ON A MAC-TABLE CACHE

CROSS REFERENCE TO RELATED APPLICATION

The present application claims priority to U.S. Provisional Application Ser. No. 63/041,828, filed on Jun. 20, 2020, which are hereby incorporated by reference in their entirety.

FIELD

The present invention relates to a method and a system for resolving UNI (User-network interface) port information on an external system on chip (SOC) and/or switch and, more particular, a method and a system that utilizes a mac-table cache for resolving UNI port information on an external system on chip (SOC) and/or switch.

BACKGROUND

ITU-T G.999.1, a document released by International Telecommunication Union (ITU), titled "Interface between the link layer and the physical layer for digital subscriber line (DSL) transceivers" defines using specific hardware protocol to carrier information from previous level physical (PHY) device. Also, such document mentions that since chips that support G.999.1 are expansive and not widely available, they are mostly used on CO devices (co-location device) of multiple packet processing chip design. However, under the environment in which ITU-T G. 999.1 is used to carry port information, such chips that support G. 999.1 tend to be expensive, and there are only few choices available.

Also, port information encapsulation by VLAN (Virtual Local Area Network) ID encapsulates UNI (User-network interface) port of a packet as a special VLAN ID, and is mostly used in multiple-chip solution CPE (Customer-premises equipment) to carry port information between different chips.

However, if VLAN ID is used to carry port information, one level of VLAN may be wasted, since most switches support only two level of VLAN ID, and that would remove the two tag support from the CPE with those cheap switches. Further, the overhead is high for an existing turnkey solution to adopt the packet processing chip, because the switch VLAN usage needs to be heavily reorganized.

While using VLAN ID to carry port information resolves issue caused in upstream traffic, such method still possesses problems, that when packet processing for downstream traffic is different based on its UNI port.

SUMMARY OF THE DISCLOSURE

This invention relates to a method and a system for resolving UNI port information on an external system on chip (SOC) and/or switch and, more particular, a method and a system that utilizes a mac-table cache for resolving UNI port information on an external system on chip (SOC) and/or switch.

According to the present invention, a method of using a mac-table cache to resolve UNI port information on an external system of chip (SOC) is provided. The method comprises: receiving, by a packet processing chip, a packet with a source address (SA); locating, by the packet processing chip, the SA in a mac-table cache implemented on the packet processing chip; and looking up a SOC mac-table implemented on the external SOC if the SA cannot be found in the mac-table cache.

Preferably, the mac-table cache is implemented as an ASIC (application-specific integrated circuit, ASIC).

Preferably, the packet is sent from the external SOC or from a co-location device (CO) connected with the packet processing chip.

Preferably, if the SA of the packet cannot be found in the mac-table cache, the packet processing chip notifies the SOC mac-table to find out the SA of the packet, and the SOC mac-table updates the result back to the mac-table cache on packet processing chip.

Preferably, the packet processing chip deals with the packet based on the SA found in the mac-table cache.

According to the present invention, a system in which a mac-table cache is used to resolve UNI port information is provided. The system comprises: a packet processing chip with a mac-table cache implemented thereon; an external system on chip (SOC) with a SOC mac-table implemented thereon, electrically connected with the packet processing chip; and a co-location device (CO), electrically connected with the packet processing chip. The packet processing chip receives a packet with a source address (SA), the packet processing chip locates the SA in the mac-table cache, and the packet processing unit looks up the SOC mac-table if the SA of the packet cannot be found in the mac-table cache.

Preferably, the mac-table cache is implemented as an ASIC (application-specific integrated circuit, ASIC) inside the packet processing chip.

Preferably, the packet processing chip receives the packet from the external SOC or from the CO.

Preferably, if the SA of the packet cannot be found in the mac-table cache, the packet processing chip notifies the SOC mac-table to find out the SA of the packet, and the SOC mac-table updates the result back to the mac-table cache on packet processing chip.

Preferably, the packet processing chip deals with the packet based on the SA found in the mac-table cache.

DETAILED DESCRIPTION

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
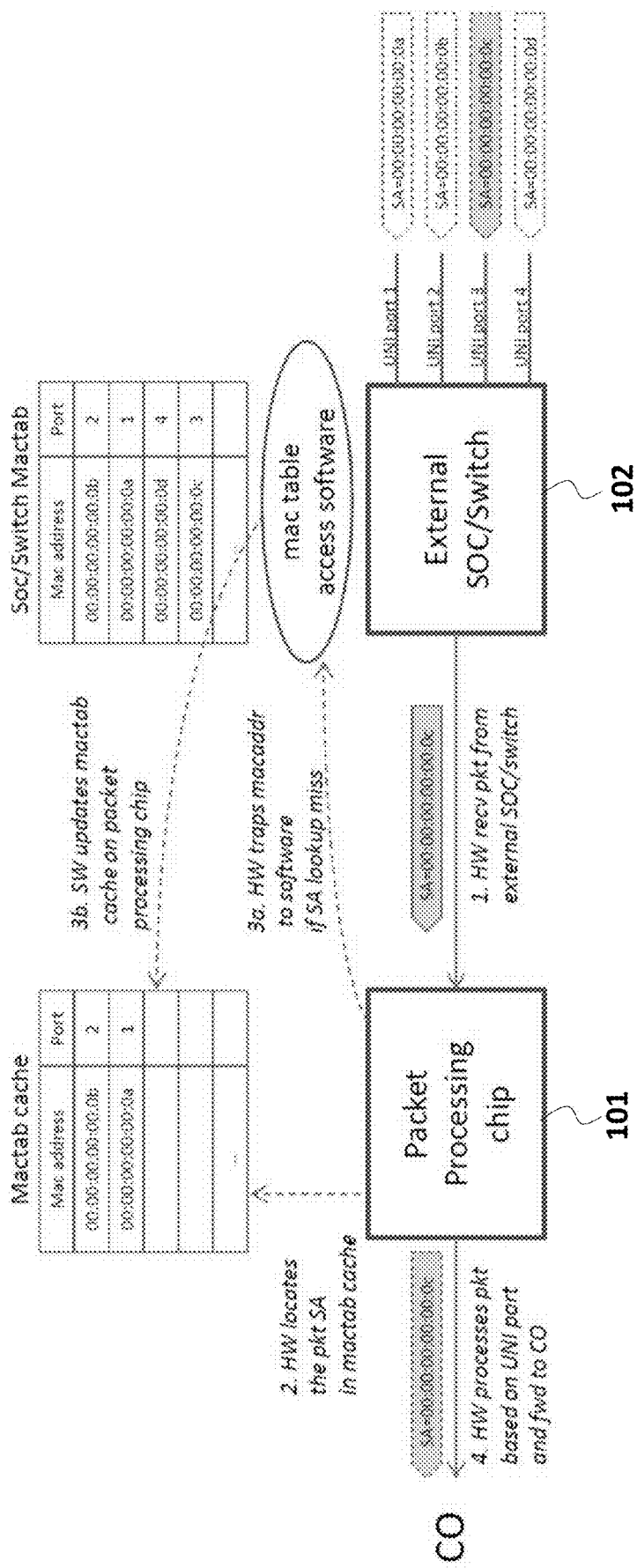
FIG. 1 illustrates a first embodiment of the present invention.

Reference is made to FIG. 1, which illustrates a first embodiment of the present invention. To be more specific, FIG. 1 illustrate how mac-table cache works for upstream packet processing. As shown in FIG. 1, a packet processing chip 101 connects with an external SOC (system on chip) 102. Such SOC may also be a switch. Therefore, in the following paragraphs SOC or SOC/switch may be used alternatively. Further, the packet processing chip 101 further connects to a co-location, CO or CO device, and the external SOC/switch 102 has four UNI port, namely UNI port 1, UNI port 2, UNI port 3 and UNI port 4, as can be seen in FIG. 1.

For upstream direction, the packet processing chip 101 receives a packet from the external SOC/switch 102. The packet processing chip 101 locates the packet's SA (source address) in a mac-table cache, where such mac-table cache is a software implemented on the packet processing chip 101. If the SA of the packet is not found, the packet processing chip 101 traps the MAC address to a software (i.e., the SOC/switch mactab as shown in FIG. 1) on the external SOC/switch 102 for UNI port lookup. Finally, the packet processing chip 101 deals with the packet based on upstream rule table and packet UNI port.

For the upstream rule table, reference is made to table 1 as listed below.

TABLE 1

| If UNI port == 1 | IVID 100->1000 |
| If UNI port == 2 | IVID 200->1000 |
| If UNI port == 3 | IVID 300->3000 |
| If UNI port == 4 | IVID 300->4000 |

Wherein IVID stands for internal VLAN ID, and UNI port is critical for port 3/port 4 upstream processing. Description about IVID is omitted, since it is well known in the technology field the present invention pertain to.

To be more specific, as described in the previous paragraph, the external SOC/switch 102 has four UNI ports, namely UNI port 1, UNI port 2, UNI port 3 and UNI port 4, and each receives packet with different SAs. For example, as shown in FIG. 1, UNI port 1 receives packet with SA=0:00:00:00:00:0a, UNI port 2 receives packet with SA=0:00:00:00:00:0b, UNI port 3 receives packet with SA=0:00:00:00:00:0c and UNI port 4 receives packet with SA=0:00:00:00:00:0d.

In the upstream scenario, the packet processing chip 101 receives a packet from the external SOC/switch 102. For example, the packet received by the packet processing chip 101 is from UNI port 3, so that the packet is with SA=0:00:00:00:00:0c. The packet processing chip 101 locates the packet SA (SA=0:00:00:00:00:0c) in the mac-table cache.

As can be seen in FIG. 1, the current mac-table cache has only two MAC addresses in record, namely 0:00:00:00:00:0b from UNI port 2 and 0:00:00:00:00:0a from UNI port 1. Whereas no SA=0:00:00:00:00:0c can be found in the mac-table cache. The packet processing chip 101 determines that SA lookup to be missing, then the packet processing chip 101 traps the MAC address to the software (i.e., the SOC/switch mactab) on the external SOC/switch 102 for UNI port lookup.

The SOC/switch mactab records all the SAs from different UNI ports. As can be seen in FIG. 1, the SOC/switch mactab records MAC address 0:00:00:00:00:0b from UNI port 2, 0:00:00:00:00:0a from UNI port 1, 0:00:00:00:00:0d from UNI port 4 and 0:00:00:00:00:0c from UNI port 3. Such stacking (or order) is just for exemplary purpose, so that the stacking (or order) should not be limiting the scope of the present invention.

The SOC/switch mactab updates the mac-table cache on the packet processing chip 101, so that SA=0:00:00:00:00:0c from UNI port 3 is therefore written into the mac-table cache. Once the mac-table cache has been updated, the packet processing chip 101 may process the packet based on the UNI port information, and forward the packet to CO.

In the case if the packet received by the packet processing unit 101 is with SA=0:00:00:00:00:0b or SA=0:00:00:00:00:0a, since such source address is already recorded in the mac-table cache, the packet processing chip 101 can process the packet directly, without looking into the SOC/switch mactab. The packet processing chip 101 may forward such packet (packet with SA=0:00:00:00:00:0b or SA=0:00:00:00:00:0a in the present embodiment) to CO directly.

Further, for the upstream rule table, such rule defines how the VLAN ID contained in the packet should be converted from one to another based on the UNI port ID, where the packet comes from (for upstream rules) or goes to (for downstream rules).

In most cases, a packet in the CPE device might have either no VLAN ID, one VLAN ID, or two VLAN ID. For packet with two VLAN ID, the outer one is called OVID, the inner one is called IVID. For packet with one VLAN ID, it is called as IVID from OMCI spec perspective.

Figure 2:
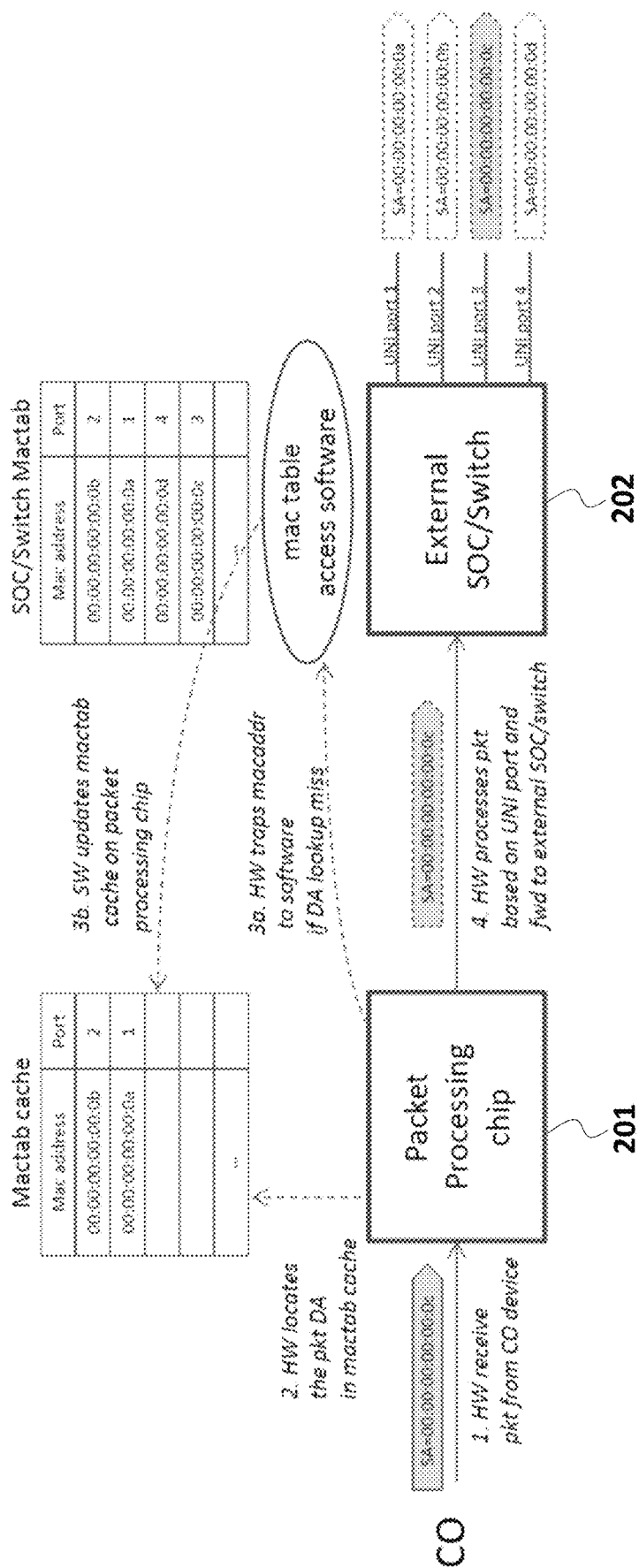
FIG. 2 illustrates a second embodiment of the present invention.

Reference is next made to FIG. 2, which illustrates a second embodiment of the present invention. To be more specific, FIG. 2 illustrate how mac-table cache works for downstream packet processing. As shown in FIG. 2, a packet processing chip 201 connects with an external SOC (system on chip) 202. Such SOC may also be a switch. Therefore, in the following paragraphs SOC or SOC/switch may be used alternatively. Further, the packet processing chip 201 further connects to a co-location, CO or CO device, and the external SOC/switch 202 has four UNI port, namely UNI port 1, UNI port 2, UNI port 3 and UNI port 4, as shown in FIG. 2.

For downstream direction, the packet processing chip 201 receives a packet from the CO. The packet processing chip 201 locates the packet's SA (source address) in a mac-table cache, where such mac-table cache is a software implemented on the packet processing chip 201. If the SA of the packet is not found, the packet processing chip 201 traps the MAC address to a software (i.e., the SOC/switch mactab as shown in FIG. 2) on the external SOC/switch 202 for UNI port lookup. Finally, the packet processing chip 201 deals with the packet based on downstream rule table and packet UNI port.

For the upstream rule table, reference is made to table 2 as listed below.

TABLE 2

| If UNI port == 1 | IVID 1000->100 |
| If UNI port == 2 | IVID 1000->200 |
| If UNI port == 3 | IVID 3000->300 |
| If UNI port == 4 | IVID 4000->300 |

Wherein IVID stands for internal VLAN ID, and UNI port is critical for port 3/port 4 upstream processing. Description about IVID is omitted, since it is well known in the technology field the present invention pertain to.

To be more specific, as described in the previous paragraph, the external SOC/switch 202 has four UNI ports, namely UNI port 1, UNI port 2, UNI port 3 and UNI port 4, and each deals with packet with different SAs. For example, as can be seen in FIG. 2, UNI port 1 deals with packet with SA=0:00:00:00:00:0a, UNI port 2 deals with packet with SA=0:00:00:00:00:0b, UNI port 3 deals with packet with SA=0:00:00:00:00:0c and UNI port 4 deals with packet with SA=0:00:00:00:00:0d.

In the downstream scenario, the packet processing chip 201 receives a packet from the CO (or CO device). For example, the packet received by the packet processing chip 201 is with SA=0:00:00:00:00:0c. The packet processing chip 201 locates the packet SA (SA=0:00:00:00:00:0c) in the mac-table cache.

As shown in FIG. 2, the current mac-table cache has only two mac addresses in record, namely 0:00:00:00:00:0b related to UNI port 2 and 0:00:00:00:00:0a related to UNI port 1. Whereas no 0:00:00:00:00:0c can be found in the mac-table cache. The packet processing chip 201 determines that SA lookup to be missing, then the packet processing chip 201 traps the MAC address to the software (i.e., the SOC/switch mactab) on the external SOC/switch 202 for UNI port lookup.

The SOC/switch mactab records all the SAs relate to different UNI ports. As can be seen in FIG. 2, the SOC/switch mactab records MAC address 0:00:00:00:00:0b related to UNI port 2, 0:00:00:00:00:0a related to UNI port 1, 0:00:00:00:00:0d related to UNI port 4 and 0:00:00:00:00:0c related to UNI port 3. Such stacking (or order) is just for exemplary purpose, so that the stacking (or order) should not be limiting the scope of the present invention.

The SOC/switch mactab updates the mac-table cache on the packet processing chip 201, so that SA=0:00:00:00:00:0c related UNI port 3 is thus written into the mac-table cache. Once the mac-table cache has been updated, the packet processing chip 201 may process the packet based on the UNI port information, and forward the packet to the external SOC/switch 202.

In the case if the packet received by the packet processing unit 201 (from CO) is with SA=0:00:00:00:00:0b or SA=0:00:00:00:00:0a, since such source address is already recorded in the mac-table cache, the packet processing chip 201 can process the packet directly, without looking into the SOC/switch mactab. The packet processing chip 101 may forward such packet (packet with SA=0:00:00:00:00:0b or SA=0:00:00:00:00:0a in the present embodiment) to the external SOC/switch 202 directly.

Further, for the downstream rule table, such rule defines how the VLAN ID contained in the packet should be converted from one to another based on the UNI port ID, where the packet comes from (for upstream rules) or goes to (for downstream rules).

In most cases, a packet in the CPE device might have either no VLAN ID, one VLAN ID, or two VLAN ID. For packet with two VLAN ID, the outer one is called OVID, the inner one is called IVID. For packet with one VLAN ID, it is called as IVID from OMCI spec perspective.

Figure 3:
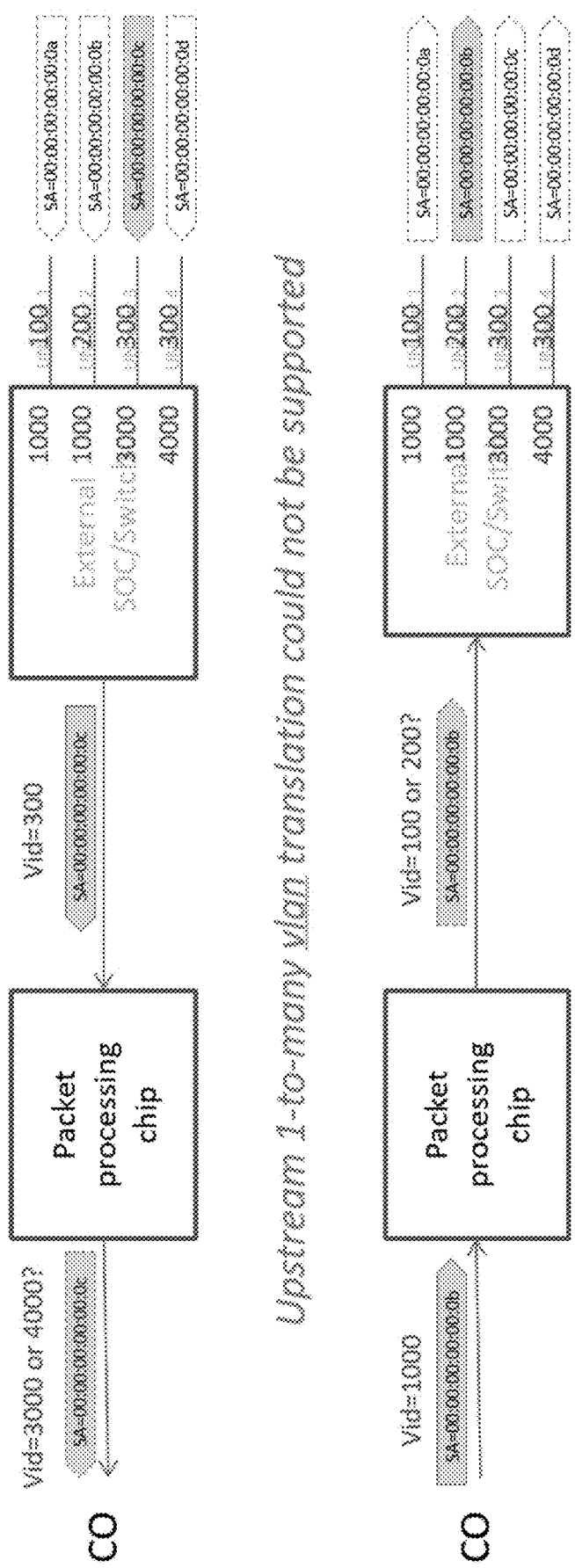
FIG. 3 is a drawing illustrating what would happen without UNI port recognition.

FIG. 3 is a drawing illustrating what would happen without UNI port recognition. For upstream, 1-to-many VLAN translation could not be supported. It can also be understood that, a packet is received from the External SOC/Switch, port 3. The respective port instruction is: port 1, Vid 100 to 1000; port 2, Vid 200 to 1000; port 3, Vid 300 to 3000; and port 4, Vid 300 to 4000. The packet is later transmits to the packet processing chip. Without UNI port recognition as provided by the present invention, the packet processing chip may not know whether to convert the Vid to 3000 or 4000.

Further referring to FIG. 3, for downstream, 1-to-many VLAN translation could not be supported. It can also be understood that, a packet is transmitted form CO, with Vid=1000. When the packet is transmitted to the External SOC/Switch, the External SOC/Switch does not know whether to convert the Vid to 100 or 200, if UNI port recognition is not supported.

According to the above descriptions, the present invention can be summarized in some aspects. One such aspect is that, for the operation of the present invention, it can be construed that, when a packet processing chip receives a packet but finds the UNI port information is missing on an external SOC/switch, the packet processing chip notifies the software on that external SOC/switch to find the UNI port information and caches it inside the packet processing chip.

According to the above descriptions, the present invention can be summarized in some aspects. One such aspect is that, for the purpose of the present invention, it can be construed that, the present invention provides a method/methodology that enables standalone packet processing chip to work with an external SOC/switch, without changing the software design on that external SOC/switch.

According to the above descriptions, the present invention can be summarized in some aspects. One such aspect is that, for the environment of the present invention, it can be construed that, the present invention may be applied under an environment that when a packet process chip is used with an external SOC/Switch chip and the packet UNI port on external SOC/switch is a critical criteria for packet processing.

As to how conventional problems are solved, it can be construed that the software running on an external SOC/switch is used to maintain the mac-table cache inside a packet processing chip, so that the packet processing chip always knows how to process a packet based on the UNI port on external SOC/switch.

In sum, the present invention provides a method for using a mac-table cache to resolve UNI port information on an external SOC or switch. It can also be construed that the method of the present invention is used by a packet processing chip to resolve a packet UNI port information on an external SOC or switch.

The mac-table cache is implemented as part of the ASIC (application-specific integrated circuit, ASIC) inside the packet processing chip. Further, a mac table access software is running on external SOC/switch to retrieve its mac address table.

When the packet processing chip receives a packet, it looks up to the mac-table cache for UNI port information. If the lookup is missed, the packet processing chip notifies the mac table access software to find out the packet UNI port information, and the software updates the result back to mac-table cache on the packet processing chip. Further, the packet processing chip deals with the packet based on the UNI port found in the mac-table cache.

The present invention may be applied to multiple kinds of potential applications, as well as multiple kinds of potential markets. To be more specific, for all scenarios that to implement a standalone packet processing chip for previous level of SOC/switch is desired. For example, GPON/XGPON router (where standalone GPON/XGPON chips are designed for route chip with only Ethernet uplink), and GPON/XGPON MDU (where standalone GPON/XGPON chips are designed for high port count switch).

In sum, the present invention provides the following advantages, comparing to conventional art. First, no special hardware protocol support is required for traditional level SOC/switch. Second, no need to change the VLAN usage for traditional level SOC/switch. Third, the present invention works for one-to-many downstream VLAN translation. Fourth, it's easy to integrate the standalone chip with existing turnkey solution.

In sum, a software is used to synchronize UNI info from external SOC/switch to packet processing chip. Consequently, there is no need to use chip with hardware based on protocol like G.999.1.

Further, the packet UNI port information is cached on a mac-table cache, therefore, there is no need to waste one VLAN tag for UNI port information carrying. To be more specific, the switch double tag capability may be fully reserved for packet processing, and the existing turnkey solutions may be easily integrated with the packet processing chip without reorganizing the SOC/switch VLAN usage heavily.

Further, the UNI port information is available in the mac-table cache for either upstream or downstream direction. That is, downstream traffic can be processed properly based on different destined UNI port.

The invention claimed is:

1. A method of using a mac-table cache to resolve UNI port information on an external system on chip (SOC), comprising:
   receiving, by a packet processing chip, a packet with a source address (SA);
   determining whether the SA is stored in a mac-table cache implemented on the packet processing chip;
   in response to determining that the SA is not stored in the mac-table cache, determining from a SOC mac-table implemented on the external SOC processing data for the SA stored in the SOC mac-table cache; and
   updating the mac-table cache implemented on the packet processing chip via the SOC mac-table;
   wherein the mac-table cache is implemented as an ASIC (application-specific integrated circuit);
   wherein the method further comprising the steps of:
   providing a co-location device (CO), the packet processing chip and the external SOC/switch to be connectively cascaded in a series, wherein the co-location device only connects to the packet processing chip; and
   sending the packet from the external SOC or from a co-location device (CO) connected to the packet processing chip.

2. The method according to claim 1, wherein the packet processing chip processes the packet based on the SA found in the mac-table cache.

3. A system in which a mac-table cache is used to resolve UNI port information, comprising:
   a packet processing chip with a mac-table cache implemented thereon;
   an external system on chip (SOC) with a SOC mac-table implemented thereon, electrically connected with the packet processing chip; and
   a co-location device (CO), electrically connected with the packet processing chip;
   wherein the packet processing chip is operatively configured to receive a packet with a source address (SA), determine whether the SA is stored in the mac-table cache, and obtain processing data from the SOC mac-table if the SA of the packet is not stored in the mac-table cache;
   wherein the packet processing chip is further operatively configured, in response to determining that the SA is not stored in the mac-table cache, to determine from the SOC mac-table implemented on the external SOC processing data for the SA stored in the SOC mac-table cache, and updating the mac-table cache implemented on the packet processing chip via the SOC mac-table;
   wherein the mac-table cache is implemented as an ASIC (application-specific integrated circuit) inside the packet processing chip;
   wherein the co-location device (CO), the packet processing chip and the external SOC are connectively cascaded in a series, and the co-location device only connects to the packet processing chip, and operatively configured such that the packet processing chip receives the packet from the external SOC or from the co-location device (CO).

4. The system according to claim 3, wherein the packet processing chip is further configured to process the packet based on the SA stored in the mac-table cache.

* * * * *